United States Patent [19]

Mori

[11] Patent Number: 4,498,460
[45] Date of Patent: Feb. 12, 1985

[54] SOLAR COLLECTOR

[76] Inventor: Kei Mori, 3-16-3-501, Kaminoge, Setagaya-ku, Tokyo, Japan

[21] Appl. No.: 566,062

[22] Filed: Dec. 27, 1983

[51] Int. Cl.³ .............................................. F24J 3/02
[52] U.S. Cl. .................................. 126/440; 126/424; 350/96.18
[58] Field of Search .................... 126/440, 438, 424; 350/96.18; 356/5, 243

[56] References Cited

U.S. PATENT DOCUMENTS

| 4,167,328 | 9/1979 | Cross et al. | 350/96.18 X |
| 4,201,197 | 5/1980 | Dismer | 126/440 X |
| 4,332,238 | 6/1982 | Garcia, Jr. | 126/424 X |

FOREIGN PATENT DOCUMENTS

| 51851 | 5/1982 | European Pat. Off. | 126/440 |
| 2384216 | 11/1978 | France | 126/440 |
| 14031 | 1/1979 | Japan | 126/440 |

Primary Examiner—Larry Jones
Attorney, Agent, or Firm—Jordan and Hamburg

[57] ABSTRACT

The sunlight is converged by a lens into a fiber optic cable to propagate therethrough to a desired location. The light receiving end of the fiber optic cable is movable in two directions which are perpendicular to an optical axis of the lens and to each other and in a direction which is parallel to the optical axis of the lens. The movement of the cable end is effected by motors which are controlled by a remote controller through interengaged guide rods and gear elements.

7 Claims, 5 Drawing Figures

SOLAR COLLECTOR

BACKGROUND OF THE INVENTION

The present invention relates to an improvement in a solar collector which converges the sunlight by a lens assembly into fiber optic cables and guides the light to a desired location therethrough for lighting or other applications. More particularly, the present invention is concerned with an improvement in a mechanism for adjusting the positions of light receiving ends of the fiber optic cables into register with the focal points of lenses associated therewith.

Utilization of solar energy is a key to energy saving and attracting increasing attention in various fields today. The applicant has presented various proposals concerning effective use of solar energy. For the most effective use of solar energy, it should be availed as optical energy, that is, without being transformed into any other kind of energy, such as electricity or heat. In light of this, the applicant has proposed a system which converges solar energy to guide it through fiber optic cables to a location where lighting is needed.

In an example of the applicant's proposed lighting system, a lens unit or module comprises a lens for converging the sunlight, a frame for holding the lens, and a bottom plate closing the bottom of the lens unit. The converged sunlight is conducted by a fiber optic cable to a desired station.

The conduction of solar energy through a fiber optic cable as described above provides for lighting which is free from conversion loss or the like, realizing the most efficient use of solar energy.

The primary requisite in a solar collector of the type described is that the light receiving end of each fiber optic cable be held in register with the focal point of a lens associated therewith; otherwise, the sunlight converged by the lens would fail to be efficiently introduced into the cable.

The applicant has proposed a mechanism for manually adjusting the position of the light receiving end of a fiber optic cable into register with the focal point of a lens. The mechanism is constructed to move a cable end in first and second directions perpendicular to each other and in a third direction perpendicular to the first and second directions. Although successful to achieve the purpose, the prior art mechanism described suffers from consumption of disproportionate time and labor for the adjustment due to the manual adjustment design. Such a drawback is particularly pronounced in the case of a multi-lens type solar collector which uses a number of lens units of modules.

SUMMARY OF THE INVENTION

It is therefore an object of the present invention to provide an improved solar collector which is capable of automatically bringing a light receiving end of a fiber optic cable into register with a focal point of a lens, thereby promoting fast and accurate adjustment.

It is another object of the present invention to provide an improved solar collector which allows the adjustment to be performed at a remote place so as to overcome difficulty of access thereto.

It is another object of the present invention to provide a solar collector which allows the light receiving end of a fiber optic cable to be readily moved along the optical axis of a lens, thereby enabling only a desired wavelength component of the sunlight to be collected.

It is another object of the present invention to provide a generally improved solar collector.

In a solar collector having a lens for converging sunlight, and a support block for supporting a fiber optic cable a light receiving end of which is located at a focal point of the lens, the sunlight converged by the lens being guided by the fiber optic cable to a preselected location, the improvement of the present invention comprises a first positioning device for moving the light receiving end of the fiber optic cable along an optical axis of the lens, a second positioning device for positioning the support block in two different directions which are perpendicular to the optical axis of the lens and to each other, the first positioning device comprising a through bore formed in the support block, a holder member for holding an end portion of the fiber optic cable which is adjacent to the light receiving end, a recess extending axially in one of a wall of the through bore and an outer peripheral surface of the holder member, a lug formed on the other of the wall of the through bore and the outer periphral surface of the holder member to be engaged in the recess, a thread formed in an outer periphery of the holder member, and a gear element engaged with the thread at an inner peripheral surface thereof and having teeth formed in an outer peripheral surface thereof, the fiber optic cable being movable along an axis of the through bore through the gear element, and drive means for driving the first and second positioning means, whereby the light receiving end of the fiber optic cable is caused to coincide with the focal point of the lens.

In accordance with the present invention, the sunlight is converged by a lens into a fiber optic cable to propagate therethrough to a desired location. The light receiving end of the fiber optic cable is movable in two directions which are perpendicular to an optical axis of the lens and to each other and in a direction which is parallel to the optical axis of the lens. The movement of the cable end is effected by motors which are controlled by a remote controller through interengaged guide rods and gear elements.

The above and other objects, features and advantages of the present invention will become apparent from the following detailed description taken with the accompanying drawings.

DESCRIPTION OF THE PREFERRED EMBODIMENT

While the solar collector of the present invention is susceptible of numerous physical embodiments, depending upon the environment and requirements of use, a substantial number of the herein shown and described embodiment have been made, tested and used, and all have performed in an eminently satisfactory manner.

Figure 1:
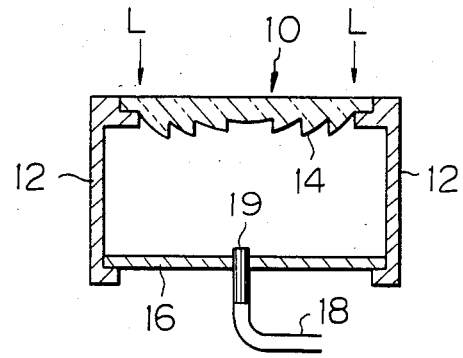
FIG. 1 is a schematic view of a lens unit of a solar collector to which the present invention is applicable.

Referring to FIG. 1 of the drawing, one lens unit or module of a solar collector to which the present invention is applicable is shown and generally designated by the reference numeral 10. The lens unit includes a frame 12 which securely supports a lens 14 thereon. The end of the frame 12 opposite to the lens 14 is closed by a bottom plate 16. A fiber optic cable 18 is located such that the sunlight L converged by the lens 14 is incident on an end 19 of the cable 18. The sunlight L converged by the lens 14 into the cable 18 will propagate therethrough to a desired location to serve lighting and other purposes as desired.

Figure 2:
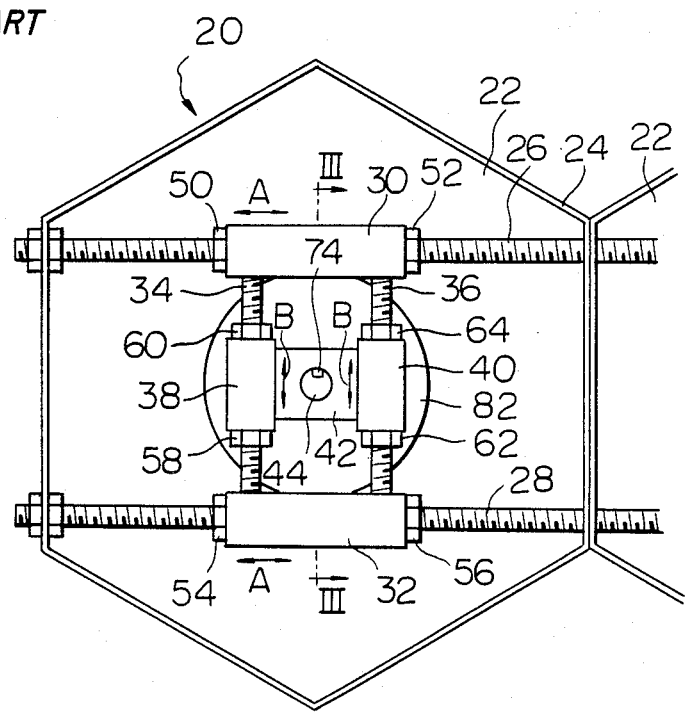
FIG. 2 is a rear end view of one lens unit included in a prior art solar collector.
Figure 3:
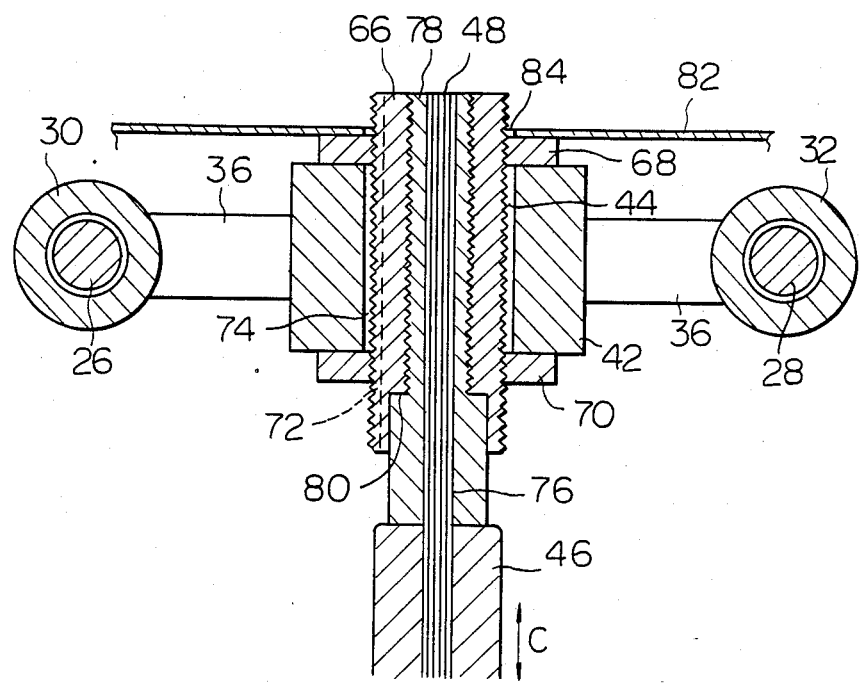
FIG. 3 is a section along line III—III of FIG. 2.

A prior art solar collector of the type shown in FIG. 1 and proposed by the applicant is shown in FIGS. 2 and 3. One of a plurality of lens units of the solar collector is designated by the reference numeral 20. The lens unit 20 comprises a hexagonal Fresnel lens 22 which is supported by a frame 24. Threaded guide rods 26 and 28 extend parallel to each other in a bottom portion of the lens unit 10. Sleeves 30 and 32 are respectively coupled over the guide rods 26 and 28 to be slidable therealong each in a direction indicated by a double-headed arrow A. Second threaded guide rods 34 and 36 span the sleeves 30 and 32 in parallel to each other. A sleeve 38 is coupled over the guide rod 34 and a sleeve 40 over the guide rod 36, each of the sleeves 38 and 40 being movable in a direction indicated by a double-headed arrow B.

A support block 42 is formed with an aperture 44 substantially at the center thereof and carried by the sleeves 38 and 40. As shown in FIG. 3, a fiber optic cable 46 is received in the aperture 44 of the support block 42. The end 48 of the fiber optic cable 46 is positioned such that, as described with reference to FIG. 1, the sunlight converged by the Fresnel lens 22 becomes incident on the cable end 48 to be guided thereby to a desired station.

In the construction described above, because the sleeves 30 and 32 are movable in the direction A along the associated guide rods 26 and 28, and the sleeves 38 and 40 in the direction B along the associated guide rods 34 and 36, the aperture 44 in the support block 42 may be located as desired in the vicinity of the focal point of the Fresnel lens 22 and in a plane parallel to the sheet surface of FIG. 2. In detail, to position the sleeves 30 and 32 in the direction A, nuts 50 and 52 engaged with the guide rod 26 and nuts 54 and 56 engaged with the guide rod 28 are loosened and, to position the sleeves 38 and 40 in the direction B, nuts 58 and 60 on the guide rod 34 and nuts 62 and 64 on the guid rod 36 are loosened. After the sleeves on the guide rods are moved until the aperture 44 in the support block 42 reaches a desired position, the nuts associated with the sleeves are tightened to fasten them. This surely locks the sleeves in position and prevents them from being dislocated after the positioning operation.

As shown in FIG. 3, the fiber optic cable 46 is received in the aperture 44 of the support block 42. The support block 42 is integral with the sleeves 38 and 40 and, therefore, movable in both the directions A and B as shown in FIG. 2. The fiber optic cable 46 is retained by a hollow cylindrical holder 66 to be movable in a direction C. The holder 66 is threaded at the outer periphery thereof to be engaged with nuts 68 and 70, and an axial recess or groove 72 in which a lug 74 of the support block 42 is received. When the nuts 68 and 70 are loosened, the holder 66 is movable in the direction C guided by the groove 72 and lug 74. As soon as the holder 66 reaches a desired position, the nuts 68 and 70 are tightened to securely fasten the holder 66 thereat, allowing hardly any dislocation of the holder 66 to occur thereafter.

The fiber optic cable 46 is inserted into the holder 66 and, as previously mentioned, the cable end 48 is positioned to the focal point of the lens 22. As shown in FIG. 3, the tip portion of the cable 46 is stripped to expose a fiber portion 76 to the outside. A hollow cylindrical metal fitting 78 securely holds the fiber portion 76 thereinside to constitute a tip portion of the cable 46. The outer periphery of the metal fitting 78 is threaded to be engaged with a threaded inner periphery of the holder 66. In assembly, after the metal fitting 78 is fit on the stripped fiber portion 76 of the cable 46, the holder 66 is screwed onto the metal fitting 78. As shown, the inner periphery of the holder 66 and the outer periphery of the metal fitting 78 are shouldered as at 80 complementarily to each other so that, when the holder 66 is screwed onto the metal fitting 18 until the shoulders abut against each other, the cable end 48 may be automatically positioned in a predetermined relation with respect to the holder 66. The reference numeral 82 designates a partition which is formed with an opening 84 for receiving the cable assembly therein.

In the manner described above, the cable end 48 is fixed to the holder 66 which is, as previously mentioned, movable in the direction indicated by the arrow C. Therefore, the position of the cable end 48 is freely adjustable in the direction C until the cable end 48 is brought into accurate register with the focal point of the lens 22.

To position the cable end 48, all the nuts 50, 52, 54, 56, 58, 60, 62 and 64 are loosened to adjust the position of the support block 42 so that the cable end 48 is allowed to coincide with the optical axis of the lens 22. After the nuts mentioned above are tightened again, the nuts 68 and 70 are loosened to position the cable end 48 along the optical axis of the lens 22 to the focal point of the lens 22. Thereafter, the nuts 68 and 70 are tightened to fix the cable 46 to the support block 42.

The prior art solar collector described hereinabove has suffered from the previously discussed drawbacks, although effective to attain the desired solar energy collecting function.

Figure 4:
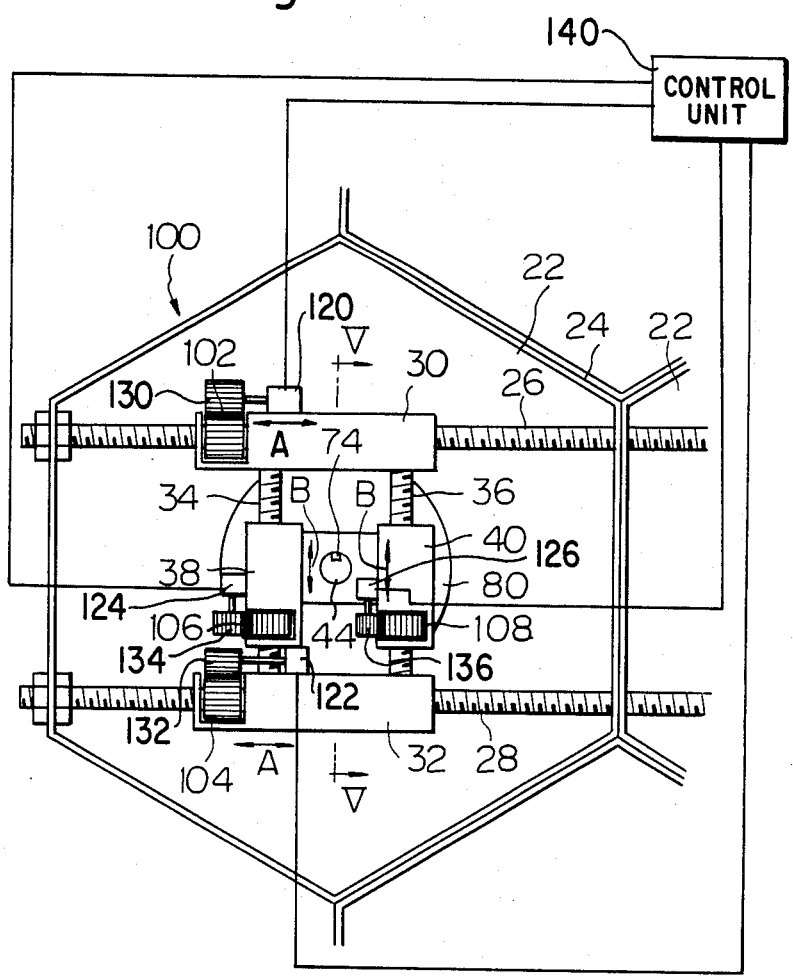
FIG. 4 is a rear end view of one lens unit included in a solar collector embodying the present invention.
Figure 5:
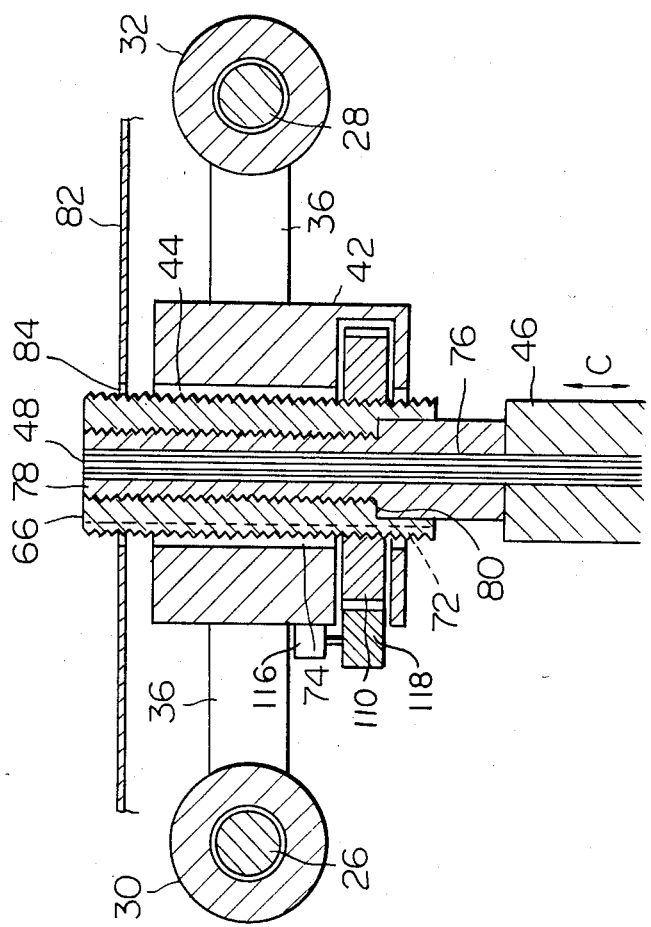
FIG. 5 is a section along line V—V of FIG. 4 with a fiber optic cable connected to the solar collector.

Referring to FIGS. 4 and 5, an improved solar collector embodying the present invention is shown. In FIGS. 4 and 5, the same or similar structural elements as those shown in FIGS. 3 and 4 are designated by the same reference numerals and detailed description thereof will be omitted for simplicity.

In FIG. 4, a gear element 102 is in threaded engagement with the threaded guide rod 26, a gear element 104 with the threaded guide rod 28, a gear element 106 with the threaded guide rod 34, and a gear element 108 with the threaded guide rod 36. The gear elements 102 and 104 are adapted for rotation to cause the support block 42 to move in the direction A, and the gear elements 106 and 108 to cause the support block 42 to move in the direction B, so that the light receiving end 48 of the fiber optic cable 46 may be brought into register with the optical axis of the lens 22.

As shown in FIG. 5, the solar collector in accordance with the present invention further includes a gear element 110 which is held in mesh with the threaded holder 66. After the gear elements 102, 104, 106 and 108 have positioned the support block 42 as described above, the gear element 110 is rotated by motor 116 and gear 118 to move the cable end 48 in the direction C until the cable end 48 coincides with the focal point of the lens 22.

As described above, in accordance with the present invention, the various gear elements engaged with the various threaded guide rods are individually rotatable in either direction to locate the light receiving end 48 of the fiber optic cable 46 to the focal point of the lens 22. Motors 120, 122, 124, 126 are mounted on the support block 42 to respectively drive gear elements 130, 132, 134, 136 allocated thereto in the desired directions. The motors are commonly connected to a control unit 140 which is located at a place remote from the solar collector. The use of motors not only promotes fast and exact positioning of the cable end 48 but allows a load to act on each of the gears after the positioning operation and, thereby, prevents the cable end 48 from being dislocated after the adjustment.

In the manner described, the solar collector of the present invention employs a motor control for positioning the light receiving end 48 of the fiber optic cable 46 to the focal point of the lens 22. The motors in this particular embodiment are remotecontrolled to cause the cable end 48 to coincide with the focal point of the lens 22. During this operation, one may observe light output from the other end of the cable 46 or compare the light output from the cable 46 with reference light which is output from another fiber optic cable to represent a condition of the sky; in the latter case, the motors will be controlled to minimize the difference between the actual light and the reference light. Where a number of fiber optic cables are arranged as in a solar collector which uses a number of lenses, the remote control over the motors will provide for exact and quick positioning of the light receiving ends of the cables to the focal points of their associated lenses, overcoming the difficult access to the cable ends.

It may sometimes be desired to collect only a specific wavelength component out of the sunlight. This is readily attainable in accordance with the embodiment shown and described because the gear element 110 may be driven by a motor to move the cable end 48 along the optical axis of the lens 22, i.e. direction C.

In summary, it will be seen that the present invention provides an improved solar collector which is capable of adjusting a light receiving end of a fiber optic cable to a focal point of a lens associated therewith in a remarkably fast and exact manner.

Various modifications will become possible for those skilled in the art after receiving the teachings of the present disclosure without departing from the scope thereof. For example, to further enhance the measure against dislocation of the cable end 48 after adjustment, each of the guide rods 26, 28, 34 and 36 and the support block 42 may be formed with axially extending recesses or grooves, while bolts may be screwed into threaded holes in the sleeves 30, 32, 38 and 40 and the support block 42 to be engaged in the axial grooves at the tips thereof.

What is claimed is:

1. In a solar collector having a lens for converging sunlight and a fiber optic cable having a light receiving end located at a focal point of the lens, the sunlight converged by the lens being guided by the fiber optical cable to a preselected location, the combination comprising:

a support block for supporting said fiber optical cable;

first positioning means on said support block for moving the light receiving end of the fiber optic cable along the optical axis of the lens;

said first positioning means comprising a through bore formed in the support block, a holder member for holding an end portion of the fiber optical cable which is adjacent to the light receiving end, a recess extending axially in one of the wall of said through bore and an outer peripheral surface of said holder member, a lug formed on the other of the wall of the through bore and the outer peripheral surface of the holder member to be engaged in said recess, a thread formed in an outer periphery of the holder member, and a first gear element engaged with said thread at an inner peripheral surface thereof, and having teeth formed in an outer peripheral surface thereof, the fiber optical cable being movable along an axis of the through bore through said first gear element;

second positioning means for positioning the support block in two different directions which are perpendicular to the optical axis of the lens and to each other, said second positioning means comprising threaded guide rods which extend perpencidular to the optical axis of the lens and to each other, and second gear elements respectively held in threaded engagement with said guide rods, the support block being movable along the threaded guide rods through said second gear elements;

first drive means including a motor for driving said first gear element of the first positioning means; and second drive means including motors for driving said second gear elements of the second positioning means;

whereby the light receiving end of the fiber optical cable is movable along said optical axis and in two directions perpendicular to each other and perpendicular to said optical axis by the motors of said first and second drive means to thereby cause the light receiving end of the fiber optic cable to coincide with the focal point of the lens.

2. In a solar collector as claimed in claim 1, in which the lug is formed on the support block and the recess in the holder member.

3. In a solar collector as claimed in claim 1, in which the lug is formed on the holder member and the recess in the support block.

4. In a solar collector as claimed in claim 1, further comprising control means for controlling the first and second drive means, said control means being located at a place remote from the solar collector and electrically connected to the first and second drive means.

5. In a solar collector as claimed in claim 1, wherein said support block has a recess intermediate the axial ends of said support block; said first gear element of said first positioning means being rotatably disposed in said recess such that rotation of said first gear element axially displaces said holder member relative to said support block.

6. In a solar collector as claimed in claim 5, wherein said first drive means further comprises a driving gear engaging said first gear element, said motor of said first drive means being mounted on said support block for driving said driving gear.

7. In a solar collector as claimed in claim 1 further comprising sleeves disposed about said threaded guide rods, each of said sleeves having a recess intermediate the longitudinal ends of the respective sleeve, said second gear elements of said second positioning means being rotatably disposed in each respective recess such that rotation of said second gear elements axially displaces said sleeves along the respective threaded guide rod.

* * * * *